J. J. DE MATTEIS

2,895,122

SUPERVISORY AND CLOCK CONTROL APPARATUS

Filed Dec. 30, 1954

July 14, 1959    J. J. DE MATTEIS    2,895,122
SUPERVISORY AND CLOCK CONTROL APPARATUS
Filed Dec. 30, 1954    9 Sheets-Sheet 5

INVENTOR.
JOHN J. DeMATTEIS
BY Robert E. Sandt
AGENT

July 14, 1959   J. J. DE MATTEIS   2,895,122
SUPERVISORY AND CLOCK CONTROL APPARATUS
Filed Dec. 30, 1954   9 Sheets-Sheet 9

FIG. 3E

INVENTOR.
JOHN J. DeMATTEIS
BY
Robert E. Sandt
AGENT

United States Patent Office 2,895,122
Patented July 14, 1959

2,895,122

SUPERVISORY AND CLOCK CONTROL APPARATUS

John J. De Matteis, Fresh Meadows, N.Y., assignor to International Business Machines Corporation, New York, N.Y., a corporation of New York Application December 30, 1954, Serial No. 478,742

3 Claims. (Cl. 340—147)

This invention relates generally to electrical communication systems and more specifically to the control apparatus for selective signalling systems of the type wherein coded impulses of predetermined frequencies are superimposed upon the commercial power distribution lines for the selective control of the energization status of remote apparatuses connected to the power lines.

One object of this invention is to combine a control apparatus for producing coded impulses having predetermined time and frequency characteristics for remote switching purpose with a clock system of the type having a master clock which periodically transmits timed impulses of a distinctive frequency for setting a plurality of secondary clocks so that there will be no interference between the two systems.

A further object of the invention is to provide a control apparatus for producing coded impulses having predetermined time and frequency characteristics for the remote control of switches wherein the selection of the time at which the production of impulses is to be effected as well as the time and frequency characteristics of the control impulses are under the control of a program apparatus operated in accordance with passage of sidereal time.

Another object of the invention is to provide a control apparatus for producing coded impulses having predetermined time and frequency characteristics wherein both automatic and manual means are provided for the selection of the time and frequency characteristics of the impulses.

Another object of the invention is to provide a control apparatus of the foregoing characteristics wherein the energization status of the remote apparatuses is indicated at a common central location.

A final specific object is to provide a control apparatus of the foregoing characteristics wherein apparatus is provided to check the characteristics of the transmitted signals.

The prior art has long recognized the advantages of employing coded carrier current impulses for the central control of remote equipment, particularly wherein it is uneconomic to connect the remote equipment to the central location by means of individual wiring. The present invention, by combining the central coded control equipment with the master control for a clock system preserves the advantages of the prior art devices and produces several new and useful new functions.

In large commercial, industrial and educational establishments, electric clock systems employing a single master clock and many secondary clocks, time stamps, and attendance recorders are almost universally employed, so that the time manifested throughout the establishment is uniform. By combining a control system with the clock system all regulated and controlled by a single common master clock, operation of the controlled equipment is synchronized with the operation of all of the time manifesting equipment, a feature that achieves particular importance with the controlled equipment is employed to mark the beginning or ending of work periods, as for instance the playing of recorded music. Additionally with the control system of the present invention, it is possible to take care of special circumstances throughout the establishment by a manual operation of the system.

Other objects of the invention will be pointed out in the following description and claims and illustrated in the accompanying drawings, which disclose, by way of example, the principle of the invention and the best mode, which has been contemplated, of applying that principle.

Although the present invention is concerned only with the control apparatus for producing the necessary impulses in combination with a time system, a complete system also includes receiver units which operate responsive to the transmitted impulses to connect or disconnect the controlled apparatus to the source of power. Receiving units of this nature which are particularly designed for the reception of impulses produced by the present invention are disclosed and claimed in the copending applications of A. L. Sprecker et al., Serial No. 347,762, filed April 9, 1953, now U.S. Patent No. 2,754,495, issued July 10, 1956, and of L. W. Bradley Serial No. 393,154, filed November 19, 1953, now U.S. Patent No. 2,700,757, issued Jan. 25, 1955.

The receivers of the above-identified applications are basically similar, differing in that the former acts to connect a circuit for a short interval only in response to a given transmission, and the latter acts to connect or disconnect a circuit in response to a given transmission until such time as a second transmission of different characteristics is effected. Thus, the former is suitable for sounding bells, and the latter is suitable for turning equipment on and off.

The selective response of the receiving units depends both on the frequency of the transmitted signal and upon the time characteristics or code of the impulses. In the present embodiment there is provision for control of forty distinct, remote circuits, disposed among four frequency channels, and then codal groups.

The channel frequencies of the coded signals selected for the present embodiment are referred to as the "A," "B," "C," and "D" channels and have respectively the frequencies of 3510, 4200, 5010, and 6000 cycles per second. These signals are normally transmitted over the conventional 60 cycle power distribution lines that are common to a given establishment. Of the above frequencies the "A" (3510 cycles per second) is also employed for transmitting clock correction signals.

The code employed in the present invention consists of a "start" pulse followed by one or more group selection pulses, the "start" pulse being common to all groups, and the group selection pulses being individual to each group. Additionally a final or "on" pulse determines the character or nature of the control.

Figure 6:
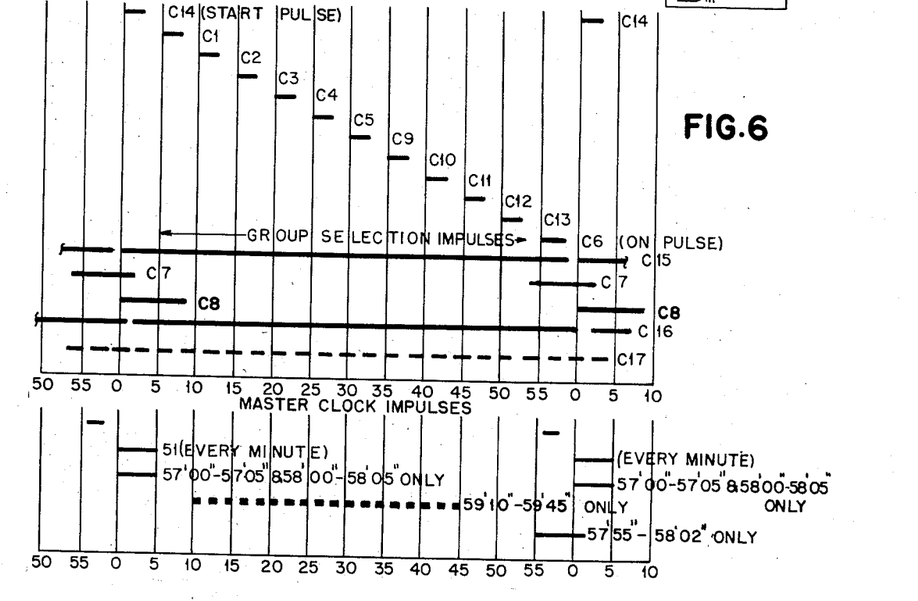
Fig. 6 is a timing diagram showing the time of closure of the various circuit components.

Referring to Fig. 6, the code is represented by bars of appropriate length whose relationship to the time index marks the time of occurrence of the code impulses. The index here shown is calibrated in seconds, a complete cycle of operation having a duration of 60 seconds. This scale represents the timing of the cycle of the control apparatus, and bears no fixed relationship to sidereal time, as the beginning of the cycle may occur at various times under different conditions.

Further inspection of the above figure reveals that the "start" pulse begins immediately with the beginning of the cycle and lasts for three seconds, or the contacts controlling the production of this impulse make at 0 seconds and break at 03 seconds, hereinafter referred to as made at 00″–03″. Additionally shown are the group selection impulses for ten groups, each impulse, also of three seconds' duration beginning at increments of 5 seconds. The group selection impulse timing will similarly be referred to hereinafter for the groups one through ten respectively as 05″–08″, 10″–13″, 15″–18″, 20″–23″, 25″–28″, 20″–23″, 35″–38″, 40″–43″, 45″–48″, and 55″–58″. The "on" pulse timing occurs at 55″–59″ or begins at 55 seconds and lasts for 4 seconds, ending at 59 seconds.

It is appropriate to digress briefly at this point to explain that the time references used in this specification are of two kinds. Wherein an event is stated as occurring at 55 seconds, it is to be interpreted that it starts at a time when the second hand of a sweep second timer would point to the 55th mark on the dial. If an event is stated to occur during the 56th second, it is to be interpreted as occurring during that second which is marked by the sweep of the hand from the 55th mark to the 56th mark. Similar references will be applied to the minute scale.

Returning now to a discussion of the code, both the transmitting and receiving equipment is so designed that impulses for the control of a plurality of groups may be transmitted during any one cycle, providing that the groups selected for operation have the same desired control function, inasmuch as the "on" impulse is common to all groups. If for example it were desired to energize all the equipment in the first, second, and ninth groups in a particular channel then there would be transmitted on that channel frequency a start impulse at 00″–03″, group selection impulses at 05″–08″, 10″–13″, and 45″–48″, and finally the common "on" pulse at 55″–59″.

*Operation of the system in general*

In the combined system of the present invention, the master clock performs its usual function of providing circuit closures at predetermined sidereal times for the control of various subsidiary equipment. Although any type of master clock of suitable design can be employed, one of the type shown in the Johnson et al. Patent 2,661,590, issued December 8, 1953, is preferably employed. In the clock in the present system contacts are provided for the operation of a minute-impulsed clock system such as that described in the Geiger Patent 1,745,-924, issued February 4, 1930, as well as a clock system with electronic self-regulation such as that shown in the Wagner et al. Patent 2,647,360, issued August 4, 1953. Additional special contacts are provided for the control of the signalling apparatus.

Normally, the master clock provides regular minute impulses for the stepping of the minute-impulsed secondary time equipment including program devices such as shown in the Johnson Patent 2,580,787, issued January 1, 1952. These program devices, as described in detail in this patent can be set to close any one or more circuits at any minute of any day of the week. In the present application three of such devices are employed to determine the time of occurrence as well as the characteristics of the transmitted impulses. Shortly before the end of each minute the master clock steps the program devices, and if a program is scheduled, the program devices operate in conjunction with a further master clock control impulse to initiate a cycle of operation of the control apparatus in accordance with the characteristics as determined by the program device.

*The control panel*

The control panel (Fig. 1) includes the above program units, an impulse control device, and standard relays, switches, and indicator lights whose operation will be taken up in the study of the circuit diagram. The only element in the panel, other than the program unit, that requires any explanation is the impulse control device. This device has not been illustrated in the drawings as its construction is well known to those skilled in the art. The device consists of a pair of contacts which are selectively closed by cams mounted upon a suitably journalled shaft driven at the rate of one revolution per minute by a synchronous motor, so as to close the contacts at the times indicated in the timing diagram of Fig. 6. It is to be noted that the motor circuit is normally de-energized so that the shaft is at rest with the contacts in the condition as shown at "0" seconds of cycle time in the timing diagram. Upon the limitation of a cycle of operation of the impulse timing device the contacts will be selectively opened and closed at the times indicated, considering the time of initiation of the cycle as "0" as the reference. The impulse control device operates all contacts labelled in the drawings as "C" followed by a number.

Referring back to Fig. 1, the exterior of the panel contains lights and switches which indicate and control the energization status of the controlled equipment. Starting at the top of the panel are four similar horizontal rows of paired lights and switches, there being a row for each of the four frequency channels. Of the ten lights and switches in each row, there is a light and switch for each of the code groups. Illumination of any light in the matrix indicates that the corresponding remote piece of equipment is in an energized status. The active position of any switch in the matrix permits the impulses for that channel and group to be sent out. The inactive position blocks such transmission. The lights and switches near the same reference characters used in the wiring diagram for ready correlation.

Figure 1:
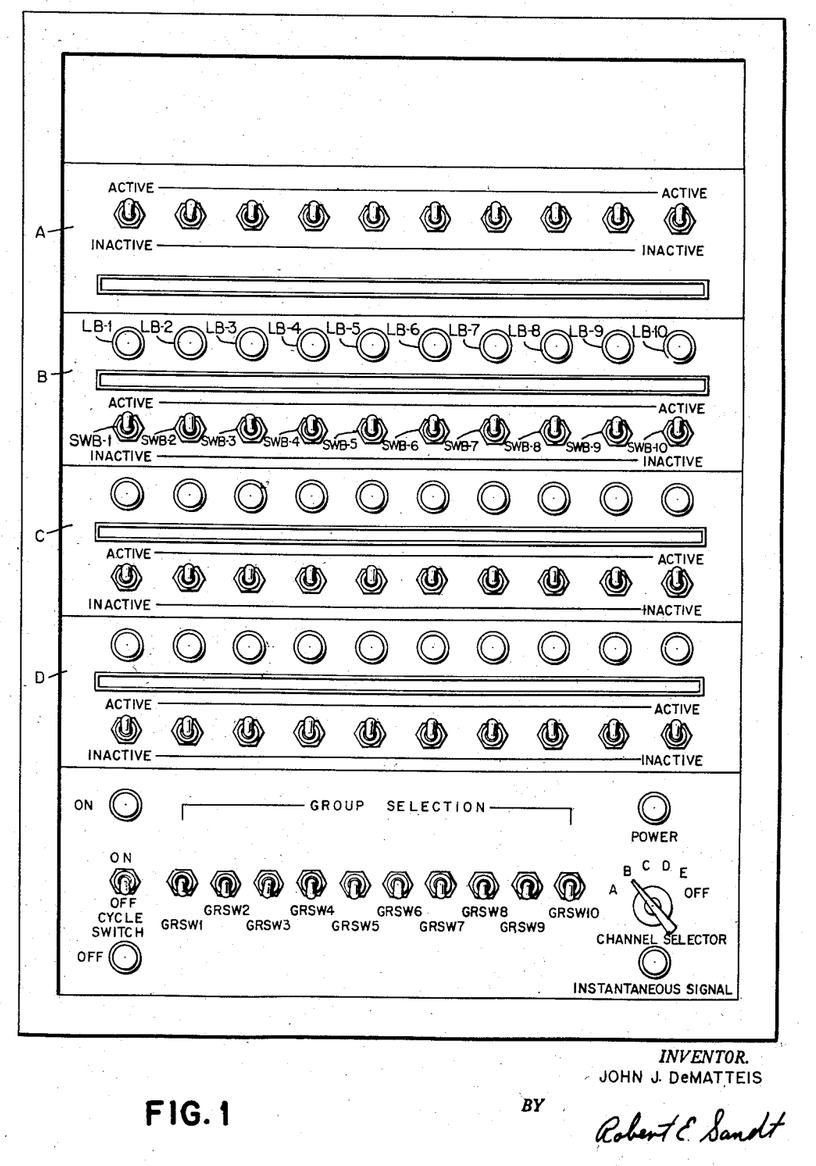
Fig. 1 is an exterior view of the control apparatus showing the arrangement of indicator lights and switches shown in the wiring diagram.

The bottom section of the panel contains the master switches as well as the switches for initiating a manual transmission. The power light indicates that panel is powered, that is the channel selector switch is in other than the "off" position. The channel selector switch may occupy any position other than "off" during an automatic transmission, but must be set to the desired channel for a manually-initiated transmission. Additionally one or more of the group selection switches GRSW–1 to GRSW–10 must be turned on to effect the transmission of the necessary group selection impulses. The cycle switch is a center-off double-throw switch which is momentarily thrown in one of the two directions to initiate a manual cycle in accordance with the setting of the channel selector switch and group selection switches. When it is so moved, a manual "on" or "off" cycle follows and the appropriate signal light is illuminated for the duration of the cycle to indicate the nature of the control cycle in progress. These lights are similarly lighted during an automatic cycle.

*Conventions employed in the drawings*

In the drawings all relay contacts are shown in the position they occupy when the operating coil is de-energized. Wherein latch type relays are employed the contacts are shown in the position they occupy with the latch disengaged and the coils de-energized. The energizing circuit for any relay coil is shown with a solid representation of the relay coil, whereas, a dotted representation of a coil is shown opposite the contacts it operates. An example of the relay numbering system follows.

R15—operating coil of relay 15
R15-4—fourth set of contacts of relay 15
LP2—pickup coil of latch-type relay 2
LT2—latch tripping coil of latch-type relay 2
LP2-3—third set of contacts of latch-type relay 2

All circuit breaker contacts (designated as C) are shown in their open position and the time of closure is indicated either by the length of a bar on the timing chart or as numerical values following an "M" (makes) or "B" (breaks). The numerical value indicates the time viz. M57'55", B58'02" means that the points are closed for 7 seconds beginning at 57 minutes 55 seconds and ending at 58 minutes 2 seconds of indicated time.

Normal automatic operation

During a normal automatically scheduled control operation, the program devices are stepped or indexed by the conventional minute clock stepping impulses appearing across wires 50A and 50B (Fig. 2B) by virtue of the closure at 56"–58" of master clock contacts 52 to energize the clutch magnets 60 of the program units. Inasmuch as it is assumed that a program is scheduled for this particular minute, one or more of the program circuit contacts will be closed as explained in detail in the above patent to Johnson.

Figures 3A, 4, 5:
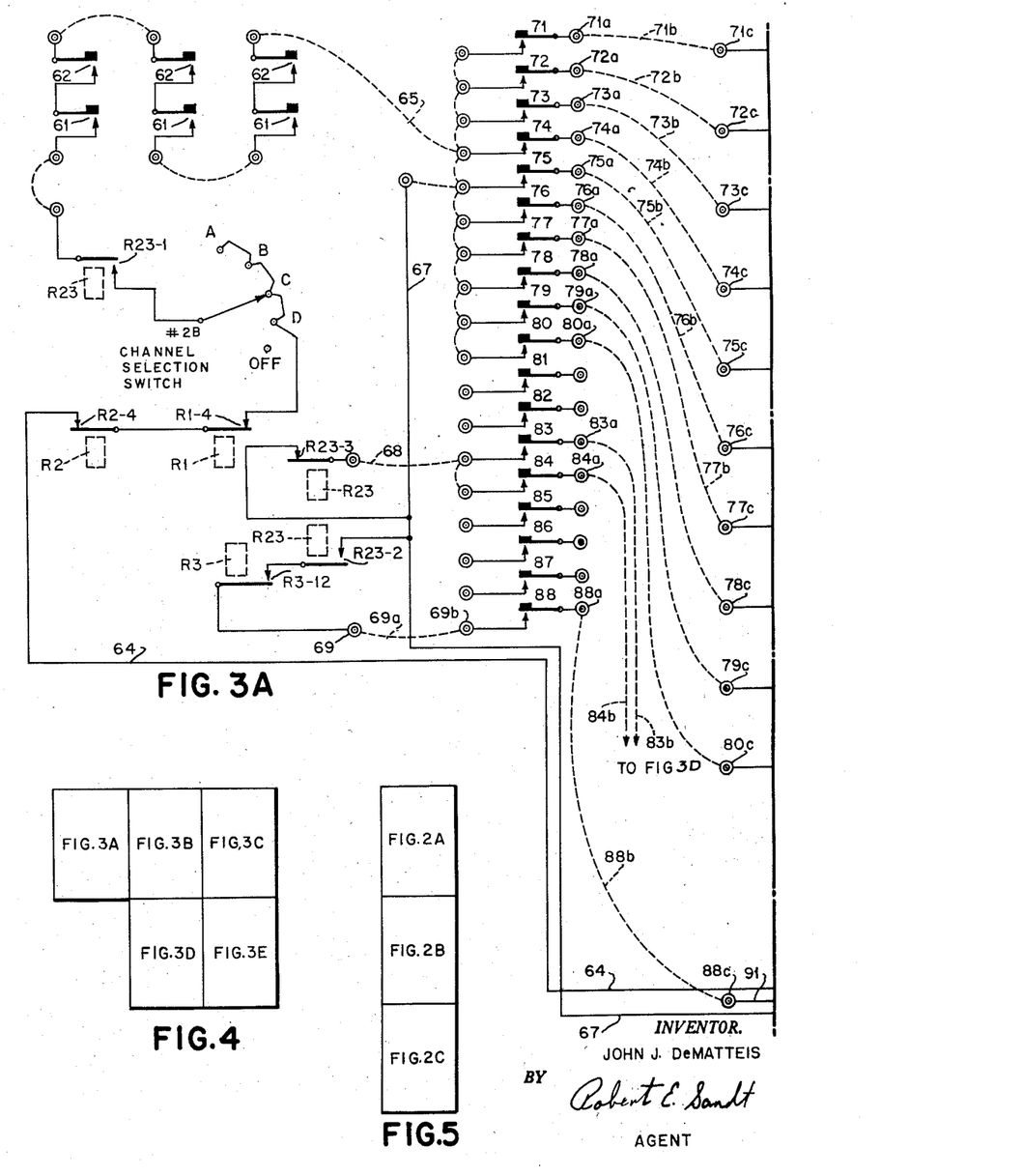
Figs. 3A, B, C, D and E taken together form a second portion of the wiring diagram.
Fig. 4 shows the relative arrangement of Figs. 2A, B, and C.
Fig. 5 shows the relative arrangement of Figs. 3A, B, C, D and E.

For purposes of illustration, let it be assumed that an "on" control is scheduled for the third group in the "C" frequency channel. For this case the arm and daily contacts 61 and 62 of the three program units (Fig. 3A) are all closed, as would be the case for any scheduled circuit closure. Additionally the contacts 73, corresponding to the third group, are closed, the contacts 83 and 84 in combination calling for a "C" channel control are closed, and the contacts 88 calling for an "on" control are closed.

Energization of R3 and R4

For the first five seconds of every minute the contacts 51 (Fig. 2B) in the master clock are closed to apply potential through terminal M-1 to energize R23. With the contacts of the program unit in the condition assumed above for the illustrative example, a circuit is established from the plus hub 63 (Fig. 3D), cam contacts C-15 (now closed), wire 64 through Fig. 3B to Fig. 3A, contacts R2-4 (N.C.), R1-4 (N.C.), channel selection switch #2B, R23-1 (now closed), program unit arm and daily contacts 61, 62 (now closed), plugwire 65, program contacts 73 (now closed), hub 73A, plugwire 73B, hub 73C, wire 73D, to Fig. 3B, R3-6 (normal), wire 66, coils R3 and R4 in parallel, R27-1, R26-1, R25-1 to ground, thus energizing R3 and R4, transferring all points thereof and providing a hold circuit from wire 64, R3-8 and R4-8 (both now transferred) in parallel to wire 66 and the coils R3 and R4. This hold circuit is maintained until R25-1, R26-1, or R27-1 open at 56" or at other special times as will be explained. With the energization of these relays, wire 67 becomes potentialized through R3-10 and R4-10 in parallel to supply potential in Fig. 3A to the program unit contacts after cessation of the M-1 impulse at 05" and deenergization of R-23.

Energization of "on" relay R1

Figure 3B:
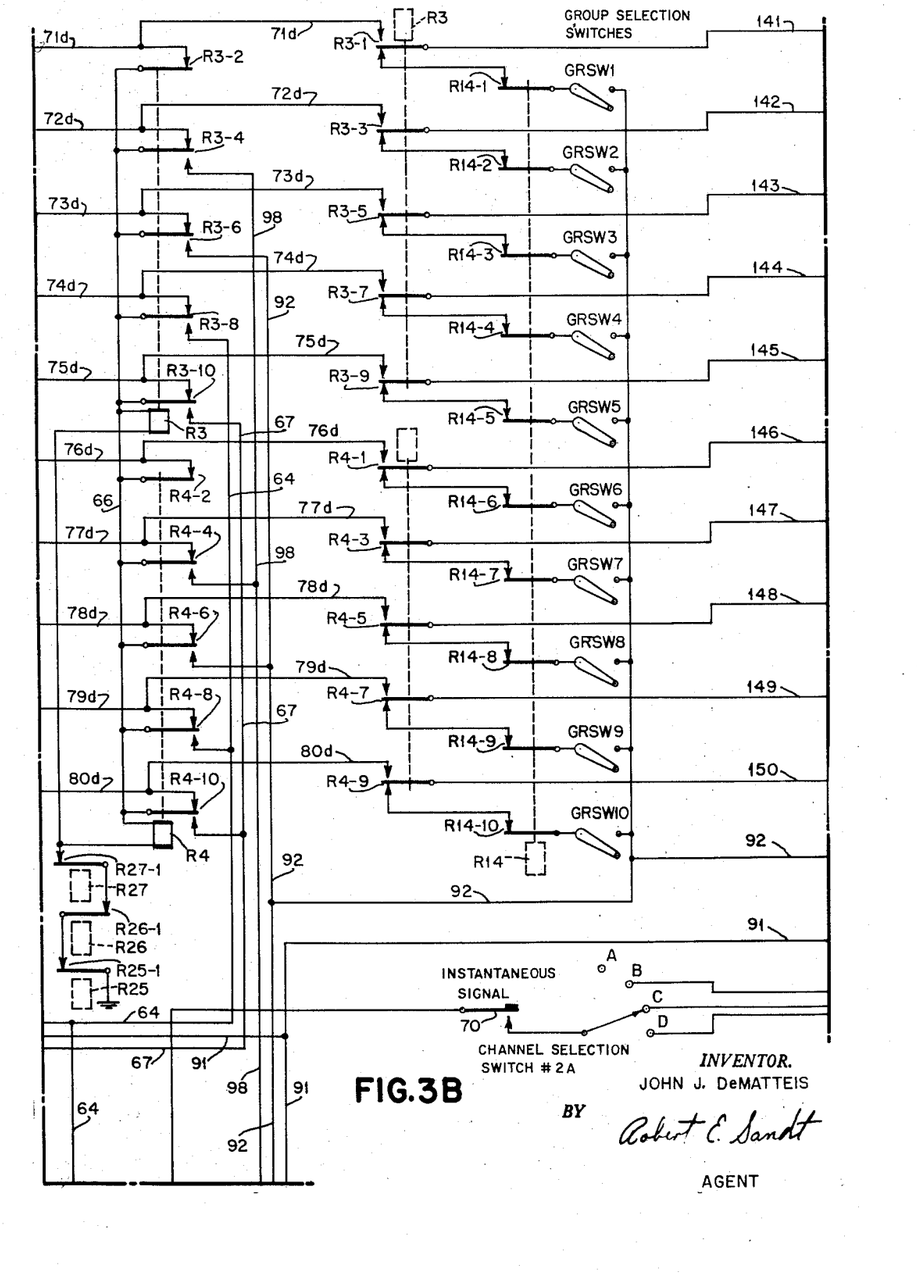
Figure 3C:
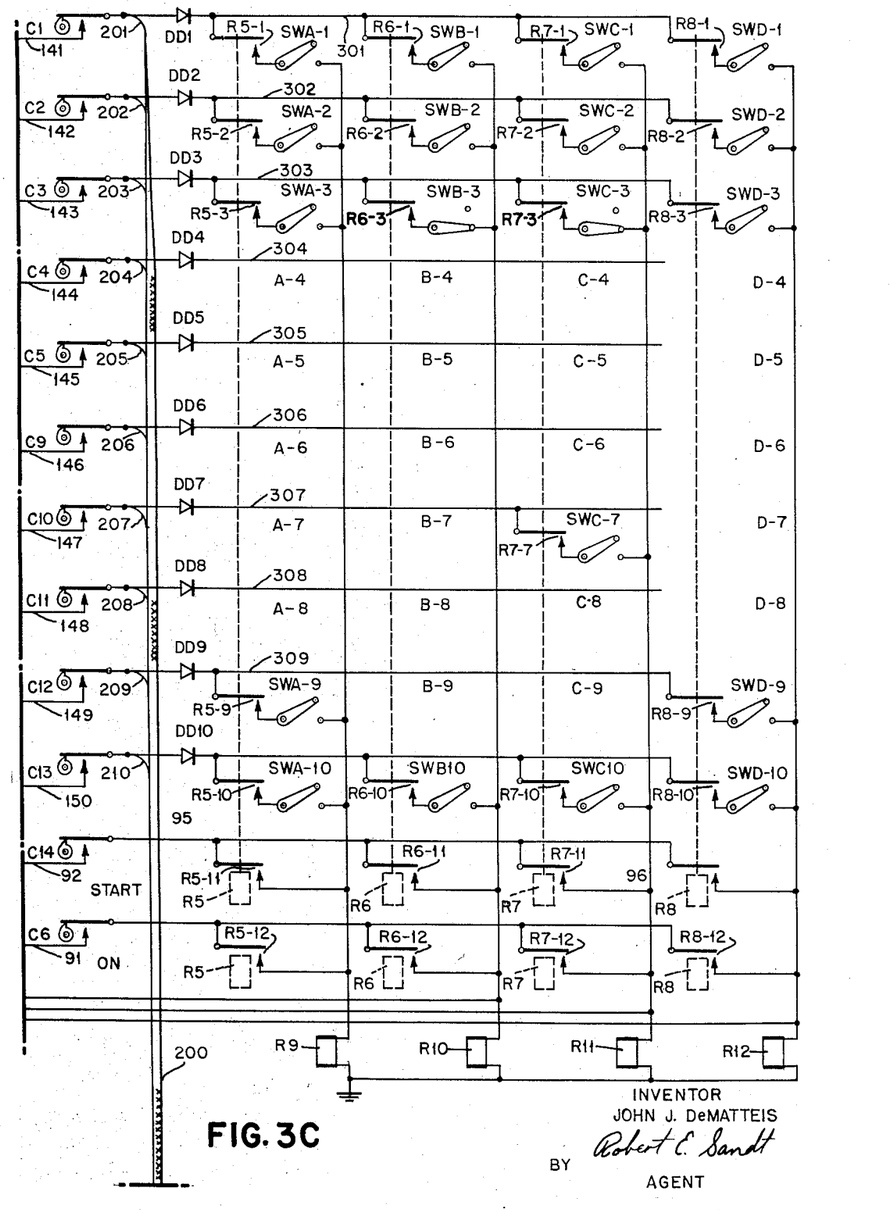
Figure 3D:
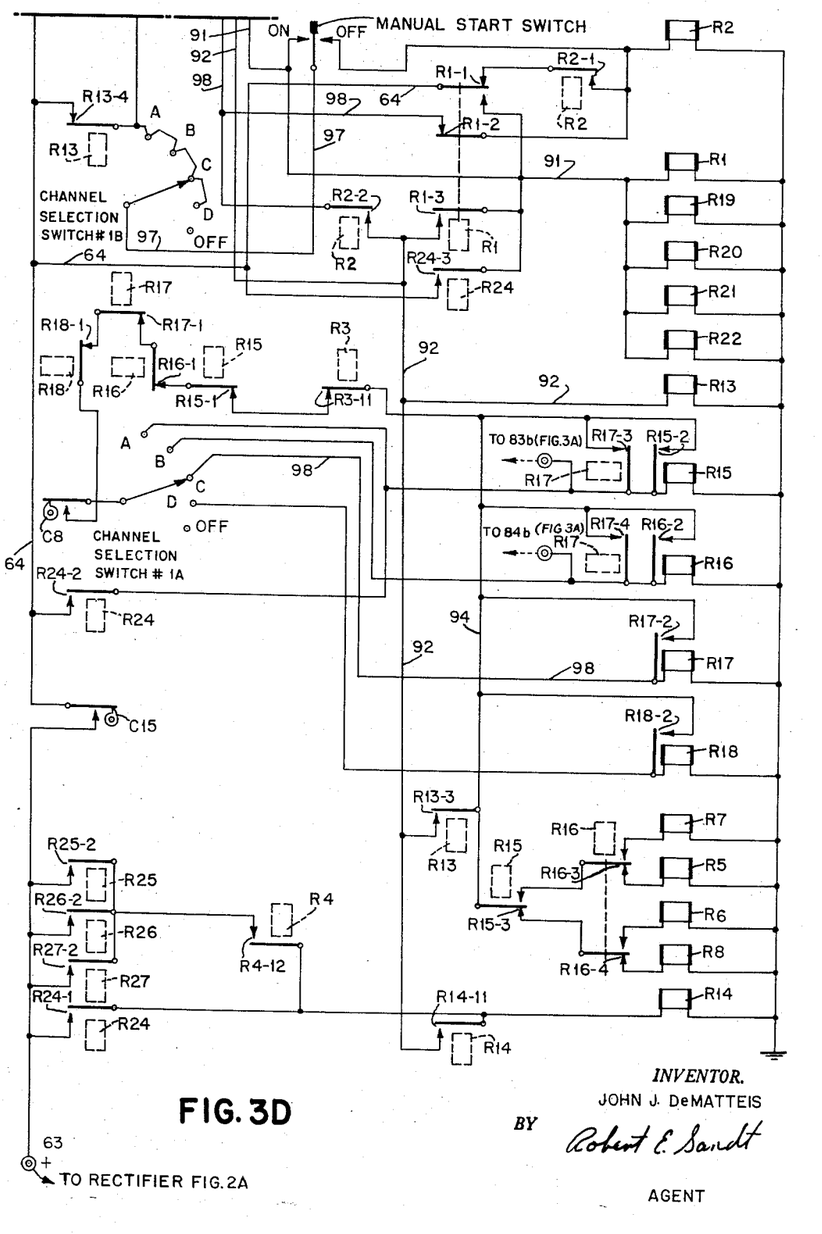

With potentializing of line 67 as explained above and with R23 still energized, potential is applied through R23-2 (Fig. 3A), R3-12 (now closed), hub 69, plugwire 69A, hub 69B, "on" contacts 88 (now closed), hub 88A, plugwire 88B, hub 88C, wire 91 through Fig. 3B to Fig. 3D and coil R1 to energize it, transferring R1-1 to provide a hold circuit to line 64 and C15. Relays R19, R20, R21 and R22 paralleled therewith are similarly energized.

Energization of R-13

With R1 energized, a pickup circuit is established for R13 from line 64, R1-1 (transferred), R-13 (now closed), wire 92 and the coil of R13. This relay is held until 59" when C15 opens to disconnect the plus potential from all relays.

Energization of channel relays

With the energization of R3 and R4 and potentializing of wire 67 and upon deenergization of R23 at 05", contacts R23-3 (Fig. 3A) reclose to apply the potential of wire 67 through plugwire 68 to program unit contacts 83 and 84 (now closed), hubs 83A and 84A, plugwires 83B and 84B to Fig. 3D and relay coils R15 and R16 respectively, thus energizing them and transferring their respective "2" contacts to connect a hold circuit through wire 94, contacts R13-3 (now closed) to wire 92 now potentialized as explained with respect to R13 for 59 seconds of the minute cycle. Points of relays R15 and R16 are arranged in a labyrinth so that only two contacts of the program unit are necessary for the control of four transmitting channel frequencies. This labyrinth of contacts, as shown in Fig. 3D, and with R15 and R16 both energized and held, a circuit is traceable from potentialized line 94, R15-3 (transferred), R16-3 (transferred) to energize R7 for the duration of the make of C15. The R7 relay controls the transmission of the "C" frequency.

Motor start and running circuit

With the energization of R13 as explained above, contacts R13-1 and R13-2 (Fig. 2A) are closed to apply 60 cycle potential to the synchronous motor SM to start it rotating. This rotation starts substantially with the beginning of the M-1 impulse at 00" lagging only the seriate pickup times of R1 and R13. Rotation of the shaft driven by the motor effects the closure of all cam contacts at the times indicated in the timing diagram, C16 being closed for the full cycle except for the first two seconds to provide a hold circuit for the motor SM for completion of the cycle during the last second of the cycle when C15 breaks and all relays, including R13, are dropped out.

Impulse transmission

With the relays R1, R3, R4, R7 and R13 energized, and the cam contact drive motor SM energized and running, as heretofore explained, the potential on line 92, appearing by virtue of the transfer of R1-1 and closure of R1-3 is connected to C14 (Fig. 3C) which closes at 00"–03" to provide a three second "start" impulse regardless of the code group selected. This three second impulse or potential pulse appears on wire 95 is passed by R7-11 (now closed) to wire 96 and the coil R11 to energize it for these three seconds. The relay R11 keys the transmitter in a fashion hereinafter to be explained to apply an impulse of comparable timing and of the "C" frequency to the transmitter line.

With continued rotation of the camshaft at 15"–18", C3 makes to provide the second or code group selection impulse traceable from potentialized line 67 (Fig. 3A), program unit contacts 73, hub 73A, plugwire 73B, hub 73C, wire 73D to Fig. 3B and R3-5 (now transferred), wire 143 to Fig. 3C and cam contacts C3 (closed for three seconds), dry disc rectifier DD3, wire 303, R7-3 (now closed), switch SWC-3 (closed), wire 96 and to the "C" channel keying relay R11 to key the transmitter on the "C" frequency coincident with the timing of C10.

The final rotation of the camshaft closed cam contacts C6 at 55"–59" to produce an "on" pulse traceable from line 91 (potentialized through R1-3 on Fig. 3D), cam contacts C6, R7-12, line 96 and to keying relay R11 to key the transmitter in timed relationship with C6 on the "C" frequency.

Thus, the transmitter has been keyed three times on the "C" frequency, with a start pulse at 00"–03", a group selection pulse at 15"–18", and an "on" pulse from 55"–59".

At 56" the next minute impulse at 50A (Fig. 2B) operates to step the program units, energizing R25, R26 and R27 to open contacts R25–1, R26–1 and R27–1 (Fig. 3B) to drop out relays R3 and R4. Upon the opening of C15 (Fig. 3D) at 59″, relays R1 (R19, R20, R21, R22), R13, R15, R16 and R7 all energized during the cycle, are dropped out, and the motor SM continues to operate until C16 (Fig. 2A) opens at 00″.

Signal generator

Figure 2A:
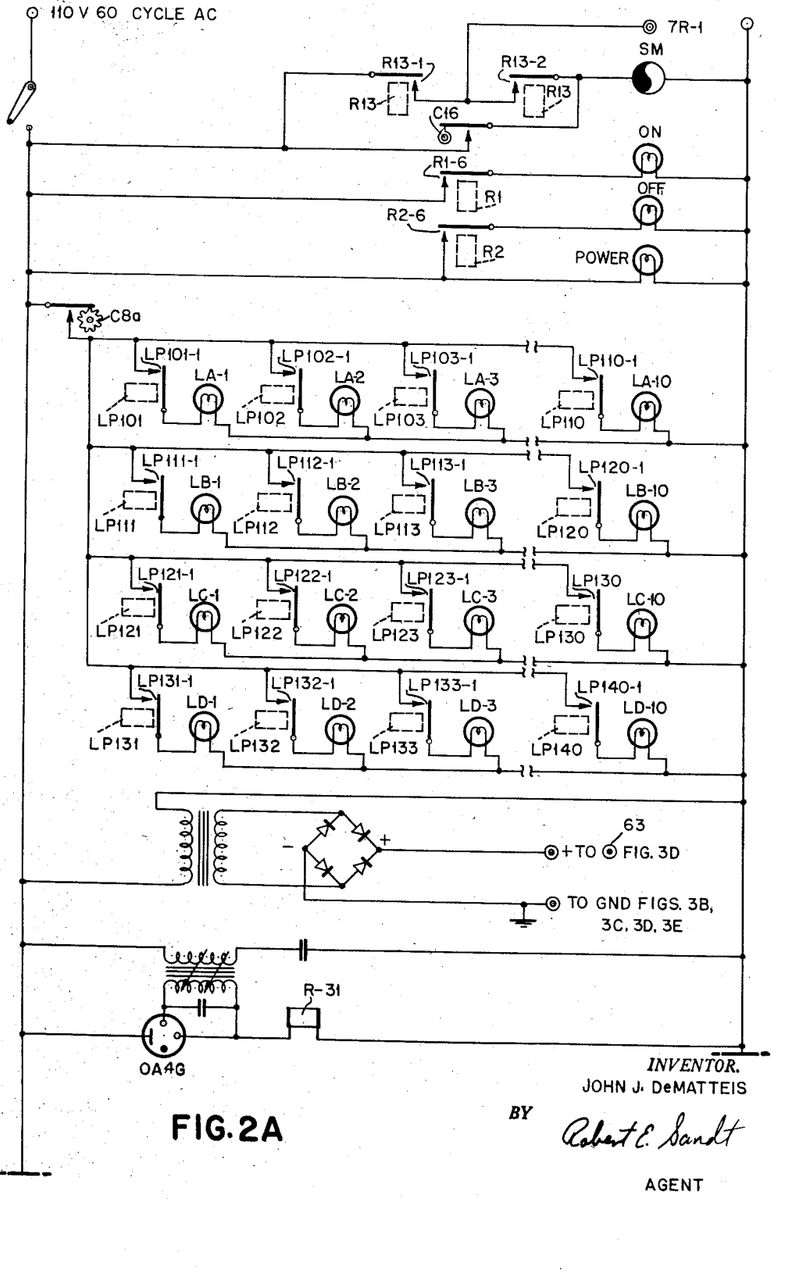
Figs. 2A, B and C taken together form a portion of the wiring diagram.
Figure 2B:
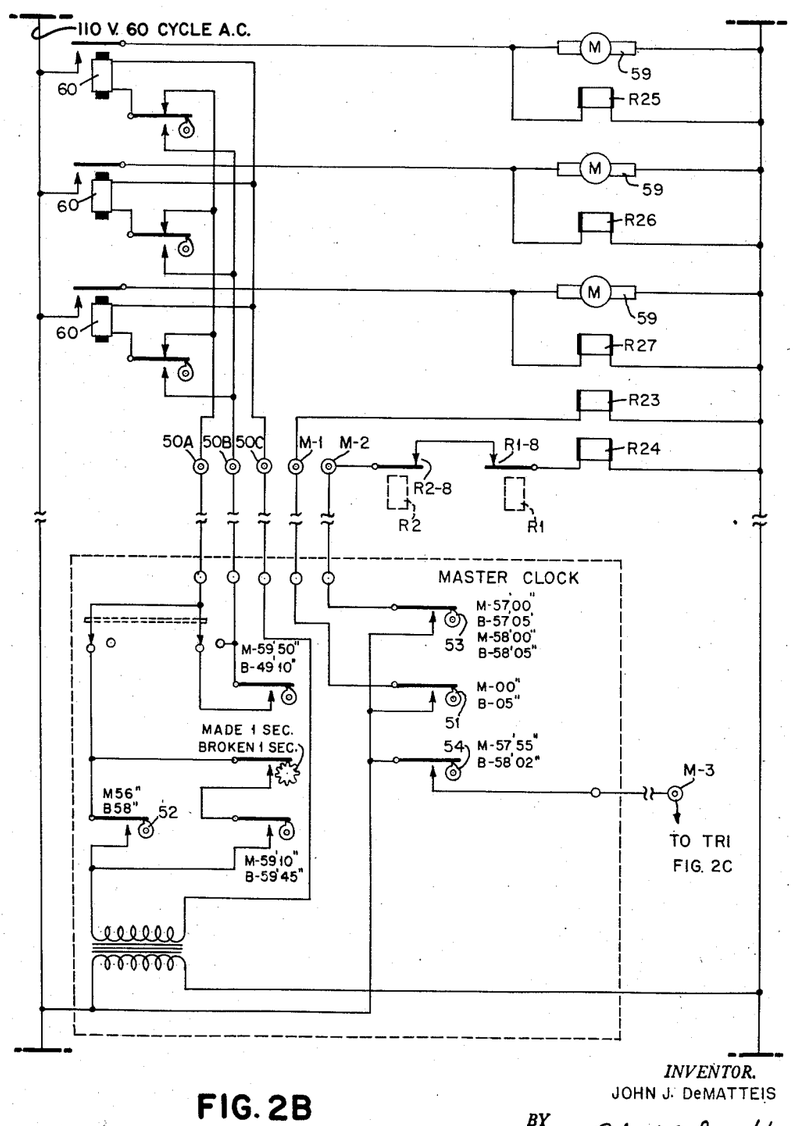
Figure 2C:
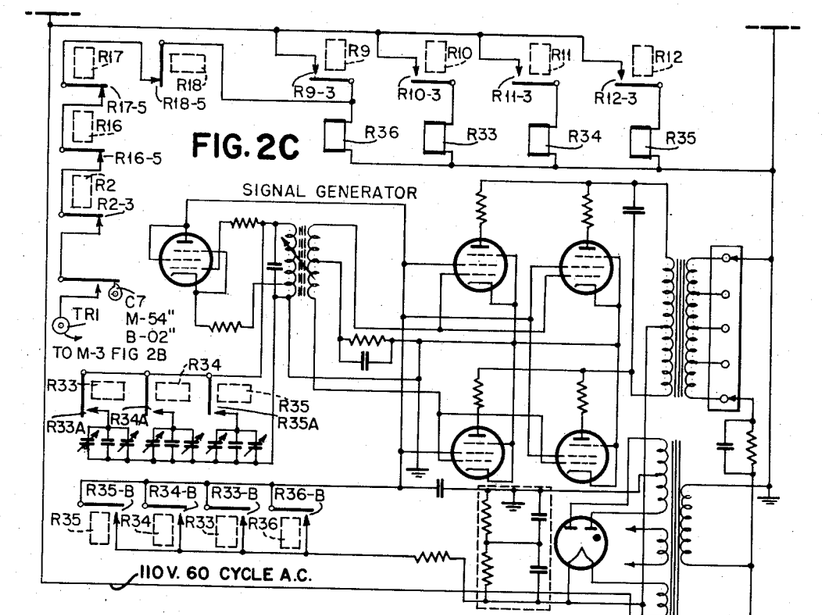

The signal generator is shown in Fig. 2C and employs the same circuits as are described in detail in connection with Fig. 6 of the Wagner et al. Patent 2,647,360. For the purposes of its present application, it need only be understood that the signal generator is capable of producing on the 110 volt 60 cycle power line a signal of any one of the four frequencies, 3510, 4200, 5010, or 6000 cycles per second.

In the illustrative example energization of relay R11 at 00″–03″, 15″–18″ and at 55″–59″ closes contacts R11–3 (Fig. 2C) to energize R34 at corresponding times. With the energization of R34 at these times R34–B closes to apply the plus potential to the oscillator causing it to oscillate at a frequency determined by the addition of the capacitors connected by the simultaneous closure of contacts R34–A, or in this case 5010 cycles per second.

Similarly energization of R9, R10 or R12 will produce a respective energization of R36, R33 or R35 and keying of the transmitter on the appropriate frequency.

Indication

Figure 3E:
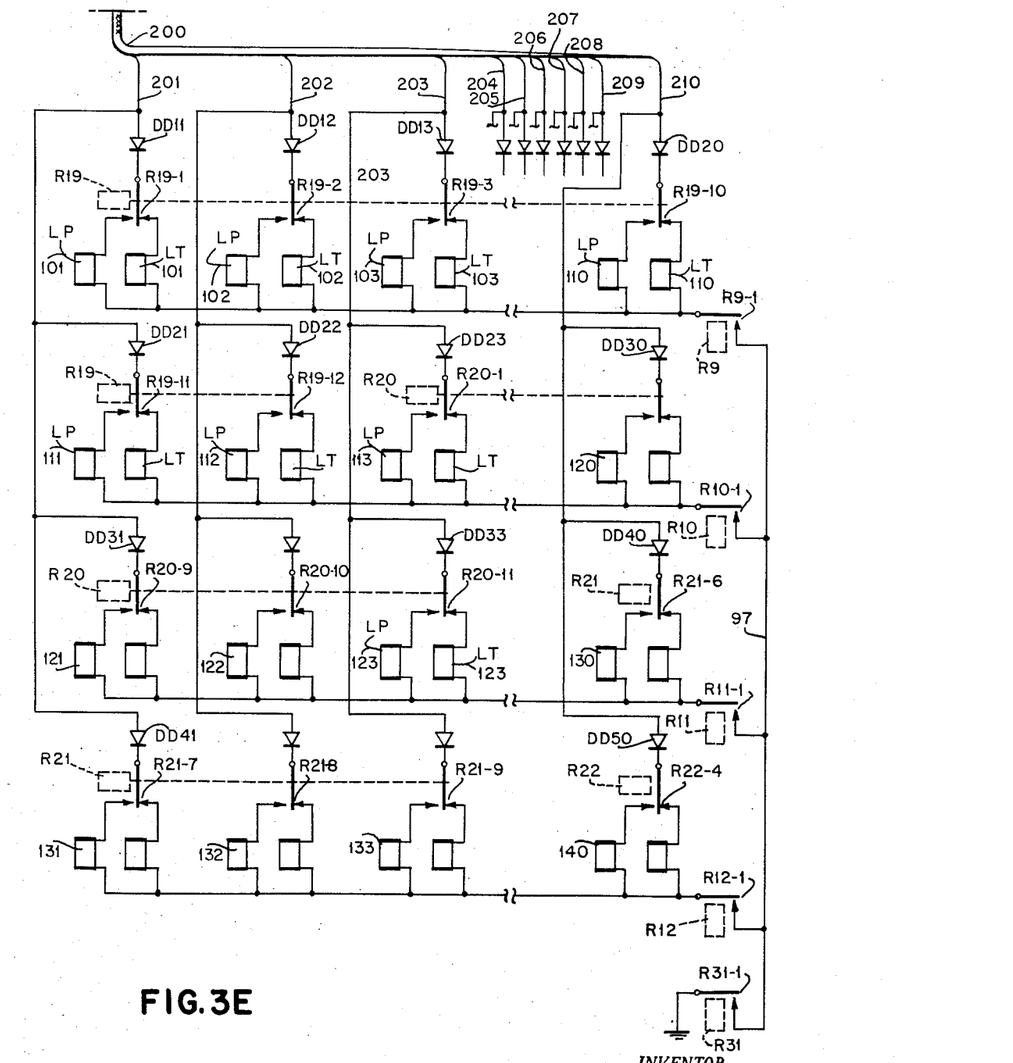

During the transmission of the group selection impulse at 15″–18″, the potential pulse passed by cam contacts C3 (Fig. 3C) appears on wire 203 in cable 299 and is transmitted to Fig. 3E, wire 203, DD33, R20–11 (now transferred), LP123, R11–1 (closed at this time), wire 97, contacts R31–1 (closed during transmission of any signal) to ground, thus energizing LP123 and latching it to hold its contacts in the transferred position.

Referring now to Fig. 2A, the energization circuit for R31 is shown as being a function of the condition of the cold cathode gas tube of the OA4G type, which tube is rendered conductive for the duration of any of the signal frequencies on the transmission line by means of series resonant and parallel resonant circuits as explained in the above Wagner et al. Patent 2,647,360. This circuit acts as a check to insure that the transmitter is actually producing impulses.

With further reference to Fig. 2A, during the transmission cycle, with R1 energized contacts R1–6 will be closed to light the "on" signal light to indicate an "on" function is being transmitted. Additionally, with the circuit breaker shaft running C8A will alternately make and break the circuit to the matrix of signal lamps so that any of those lighted will flicker to further indicate the panel is in operation. Upon the energization and latching of LP123, as explained, the contacts LP123–1 will be closed to light the LC–3 indicating lamp to indicate that the devices in the third code group on the "C" channel are now on.

Simultaneous transmission

The nature of the transmitter employed in the present invention precludes the simultaneous transmission of more than one frequency. Consequently, the program circuits can be combined so that only two program contacts are used for four frequencies. With separate program contacts for each frequency, separate oscillators for each frequency, and a rearrangement of the relay control circuits simultaneous transmission of all frequencies could be effected.

It is possible, however, to transmit the control impulses for the selection of all of the code groups of any one frequency channel during one cycle of operation, provided that the "on" or "off" control is common to all the groups. In such an instance, all of the program unit contacts from 71 through 80 would be closed to permit impulse control by all of the cam contacts associated therewith.

Manual operation

For simplicity of operation, let it be assumed that the same control is to be effected manually as was described for the automatic operation, namely an "on" function in the third group in the "C" channel.

For this operation, the channel selection switch is set to the "C" position, thus setting the ganged switches #1A and #1B (Fig. 3D), #2A (Fig. 3B) and #2B (Fig. 3A) to a corresponding position. Additionally, the group selection switch GRSW3 (Fig. 3B) is thrown to the "on" position and the remaining ones to the "off" position. Finally, the circuit selection switch SWC–3 (Fig. 3C) is thrown to the "on" position.

The manual start switch (Fig. 3D) is momentarily pressed to the left or "on" position to energize the "on" relay R–1 from line 63, C15 (now closed), wire 64, R13–4 (N.C.), switch point C of switch #1B, switch arm of #1B, wire 97, blade of manual start switch, "on" contact, wire 91, to R1 thus energizing it, transferring R1–1 to provide a hold circuit through wire 64. With the energization of R1, R1–3 is also closed to provide a pickup circuit for R13 through wire 92, R1–3 and R1–1 to wire 64. With energization of R–13, the camshaft drive motor SM is energized as previously explained to start the camshaft rotating. Also, with the energization of R13, R13–3 is closed connecting wire 92 (now potentialized) with wire 94 to R3–11 (N.C.), R15–1 (N.C.), R16–1 (N.C.), R17–1 (N.C.), R18–1 (N.C.), C–8 (closed 0″–8″), switch arm of channel selection switch #1A, contact C of said switch, wire 98, R17, and ground to energize this relay and close R17–2 to provide a hold circuit, close R17–3 to pick up and hold R15, and to close R17–4 to pick up and hold R16. With R15 and R16, the energization of R7 proceeds as before through the labyrinth of R15–3 (transferred) and R16–3 (transferred) to R7.

With wire 92 potentialized and with the camshaft running, upon closure of C14 (Fig. 3C), the start pulse is impressed on wire 95, passes through R7–11 to energize R11 for the duration of the start pulse at 00″–03″. Further rotation of the camshaft closes C3 to provide the group pulse at 15″–18″, from line 92, group selection switch GRSW3 (manually closed), R14–3 (N.C.), R3–5 (N.C.), wire 143, C3, DD3, wire 303, R7–3 (now closed), SWC–3, wire 96, R11, and ground.

The "on" pulse is delivered at 56″–59″ from line 91, potentialized by virtue of energization of R1, C6, R7–12, to R11. Each energization of R11 keys the transmitter to impress the "C" frequency on the power line. The indicator circuits for the manual operation is as exactly like that for an automatic operation.

"Off" operation—Automatic

For an automatic "off" operation, the program unit is set so that one or more of the group contacts 71 through 80, and the appropriate channel selection contacts 83 and 84 will be closed, and the "on" contact 88 will remain open. Thus, with energization of R3 and R4, as explained before, contacts R3–4 and R4–4 (Fig. 3B) will be closed to potentialize wire 98 leading to Fig. 3D, contacts R1–2 (N.C.), coil R2, closing R2–1 to provide a hold circuit through R1–1 to wire 64, C15, and plus potential. This pickup of R2 invariably occurs on any automatic operation, but if an "on" function is scheduled R1 is also picked up to open R1–2 and transfer R1–1 so that the pickup and hold circuit for R2 is immediately broken. Thus, R1 dominates R2.

The remainder of an "off" operation is similar to an "on" operation except that with R1 de-energized R1–3 open, and R1–1 normal, no potential is applied to wire 91 and the closure of C6 is ineffective to deliver an "on" pulse. Thus, the blocking of the "on" pulse provides the necessary control impulses for the "off" control.

*"Off" manual operation*

A manually-initiated "off" operation starts with the momentary closure of the manual start switch (Fig. 3D) to energize R2 from wire 64, R13–4 (N.C.) switch arm of channel selection switch #1B manual start switch "off" contacts to R2, energizing it to close R2–1 to hold through R1–1 (normal) and wire 64. The other circuits are the same as those described for a manual "on" operation with the exception that with R1 remaining de-energized wire 91 remains depotentialized and thus C6 is in operation to produce the "on" pulse.

*Indication for "off" operation*

The indicator light control relays in Fig. 3E arranged in a 4 x 10 matrix are selectively actuated in response to a group selection impulse appearing on the wires 201 to 210, and the closure of any one of the contacts R9–1, R10–1, R11–1 or R12–1, as explained in the section devoted to the indication of "on" functions. With R1 de-energized, as it is in all "off" functions, R19, R20, R21 and R22 are accordingly also de-energized and their points in Fig. 3E remain in their normal condition so that any pulses on the wires 201–210 are directed to the corresponding LT coils of the latch relays thence to the closed contact R9–1, R10, R11 or R12–1 to trip the latch of the appropriate relays in the matrix and thus extinguish the corresponding lights in Fig. 2A.

*Rapids interlock*

In minute impulsed time equipment, the standard prior art practice is to transmit a succession of rapid impulses during a portion of a predetermined minute of every hour so as to advance the secondary equipment to agreement with the master clock. Inasmuch as the program units employed in the present control station are minute impulsed as described in the above Johnson Patent 2,580,787, such rapid advance during a cycle of operation of the control station would produce a false code transmission by combining portions of codes on adjacent program bars. To obviate this difficulty, there is provided in parallel with each of program unit advancing motors 59, relays R25, R26 and R27 (Fig. 2B) which relays are energized during each stepping operation of the program units, as will be evidenced by an examination of Fig. 2B. Normally, the energization at 56"–58" for a regular minute impulse of relays R25, R26 and R27 will open R25–1, R26–1 and R27–1 (Fig. 3B) which are serially connected in the ground return of R3 and R4 to break the hold circuit for R3 and R4. Inasmuch as the last of the code group impulses (for code group 10) is transmitted at 50"–53" this dropout of R3 and R4 does not interfere with the code transmission, as the "on" relay R1 has its own hold circuit which is controlled through C15 to break at 59". However, if the program units are slow, when the rapid impulses are transmitted at 58'10"–59'45", they will be advanced, and relays R25, R26 and R27 will the energized for the duration of the advance. If the control station is in an automatically-initiated cycle of operation at this time, the energization of R25, R26 and R27 at 59'10", thus opening R25–1, R26–1 and R27–1 and dropping out R3 and R4, will prevent further transmission of the code group impulses after 10" or will block all code group impulses after the first, inasmuch as wire 67 will be depotentialized by the return to normal position of R3–10 and R4–10, so that subsequent program bars advanced into position by the rapid operation will be ineffective to control impulses during the remainder of this cycle of the control station. Where an "on" function is in progress at this time, the "on" relay R1, held through R1–1 and C15, and the channel selection relay R15 to R18 being held through their respective "2" points R1–3, R1–1 and C15, will permit the transmission of the "on" pulse of the frequency independent of the condition of R3 and R4. To prevent the reading of any of the group selection switches GRSW–1 to GRSW–10 (Fig. 3B) during the balance of a cycle which is interrupted by the rapids interlock, relay R14 is energized (Fig. 3D) from plus line 63, R25–2, R26–2 or R27–2, R4–12, R14 and ground, closing R14–11 to hold through wire 92, R1–3 (now closed), R1–1 (transferred), wire 64, C15 and plus line 63. Alternatively, if an "off" function, the hold is through wire 92, R2–2 (now closed), wire 98, R1–2 (normal), R2–1 (now closed), R1–1 (normal) and wire 64. When energized, R14 opens 14–1 to R14–10 (Fig. 3B) to isolate the group selection switches from wires 141 to 150, necessary because with the dropout of R3 and R4 the odd points 1 to 9 of R3 and R4 return to normal and would connect, but for R14, the group selection switches from potentialized line 92 to the circuit breaker lines 141–150 thus sending out a false code.

The rapids interlock has no effect on a manually initiated cycle in that R3 and R4 are not energized during a manual cycle, and consequently, in Fig. 3D, R4–12 is open so that with the closure of R25–2, R26–2, or R27–2, R14 is not energized and the above-traced circuitry is ineffective to prevent the transmission of the impulses for which the switches have been set.

*Interlocks—Manual vs. automatic operation*

The control station is provided with interlock circuits to render a manually-initiated operation ineffective if the initiation is attempted during the course of an automatically-initiated cycle of operations. Conversely, a manually-initiated cycle in progress will render an automatic program cycle ineffective.

Whenever an automatic operation is in progress R3 and R4 are both invariably energized, at least until 56". Also, invariably energized is R13 and R1 or R2. Additionally, depending on the channel selection, one of the relays R5, R6, R7 or R8 will be energized and possibly one or both of relays R15 and R16.

With the above relays in the condition stated during an automatic operation, a manual operation is prevented. With the opening of R13–4 (Fig. 3D), the arm of the channel selection switch #1B is isolated from plus line 64 so that the manual start switch is equally isolated and ineffective to energize R1 or R2. Additionally, this contact prevents the operation of the instantaneous signal switch 70 (Fig. 3B).

The channel selection switch #1A is also isolated by the opening of R3–11 and one or more of the serially connected points R15–1, R16–1, R17–1 or R18–1 so that no additional frequency relays can be energized by a repositioning of the channel selection switch during the cycle of operation. In the event that an automatically scheduled "D" channel "on" function is in operation during the minute beginning at 59'00", none of the relays R15, R16, R17 or R18 will be energized, as the program unit contacts 83 and 84 will both be open. If the program units are slow, then at 59'10" when the rapid impulses are delivered R25, R26 and R27 will be energized to drop out R3 and R4 thus reclosing R3–11 (Fig. 3D) to pass the potential of line 94 through R3–11, R15–1, R16–1, R17–1 and R18–1 (all closed) to the channel selection switch #1A, but for the presence of C–8 which is closed only at 0"–8" to prevent such potential in an operation as just described from energizing any of the R15, R16, R17 or R18 relays through one of the positions of channel selection switch #1A.

The above interlocks are equally effective during a manually initiated cycle of operation. Once the manual start switch is operated, R13 opens R13–4, the switch is rendered inoperative for the remainder of the cycle. Additionally, the inactivation of channel selection switch #1B by the opening of one of the serial points R15–1, R16–1, R17–1 or R18–1 prevents a repositioning of the channel selection switch from having any effect on the channel selection relays for the remainder of the cycle. In addition, automatic operation is prevented by a manual cycle in progress, in that either R2-4 or R1-4 (Fig.3A) will be opened for a manual cycle so that the program device is electrically isolated despite the closure of R23-1.

*Interlocks—Electronic clock correction signal*

As described in detail in the above Wagner et al. patent, the prior art practice is to superimpose upon the power distribution lines a carrier current impulse having predetermined time and frequency characteristics so that the secondary clocks will operate responsive thereto to be set to agreement with the master clock. Isasmuch as the oscillator in the present system is common to both the clock and the code control station and the "A" frequency is used both for clock control and for code signalling, provision must be made to prevent interference between the two systems, particularly where manual operations are involved.

The secondary clocks employ a movement of the type shown in the Larrabee Patent 2,569,815, issued October 2, 1951, and the setting structure as shown is adjusted for use in this system so as to be responsive to signals of no less than seven seconds. Consequently, the maximum code signal duration of four seconds has no effect upon the setting of the secondary clocks. There are, however, special circumstances when the time signal is prevented from being transmitted by a certain type of manual operation of the control panel as will be explained. Other than this, there is no interference with the normal operation of the clock.

Inasmuch as the clock correction signals are of longer duration than the code impulses, the receivers on the "A" channel would normally be set in motion by the time signal. This in itself is of no consequence as the receivers require at least two impulses to effect a change in the work circuit status. However, as the time signal is delivered at 57′55″–58′02″, all receivers would start a cycle of operation and be 5 seconds out of phase with any code signals sent out from the panel starting at 58′00″. Thus, programming in the minute beginning at 58′00″ would be precluded. If, however, the receivers were started at 57′00″ whether or not a program is scheduled, then they would have completed their cycle at 58′00″ and could be programmed during the immediate following minute.

For the above purpose, a special set of contacts 53 (Fig. 2B) is provided in the master clock which close at 57′00″ and at 58′00″ and have a five second duration. With the closure of these contacts and if the panel is idle (R1 and R2 de-energized), R24 will be energized through R2-8 and R1-8 in series. With the energization of R24, R24-1 (Fig. 3D) will be closed to energize R14, closing R14-11 to potentialize wire 92 and energize R13. Additionally R24-3 closes to energize R1 and R24-2 closes to energize R15. Relay R13, R15 and R1 hold through their usual hold circuits previously described to put the panel in operation. If a program is scheduled for this minute, it will control the panel in conventional fashion. However, programming is limited in this minute to an "on" function on the "A" channel. At 57′55″, C6 closes to control the "on" pulse which also coincides with the beginning of the clock correction impulse which is simultaneously produced by closure of master clock contacts (Fig. 2B) at 57′55″ which applies potential through M-3 to C7 (closed 54″-02″ of every panel cycle), R2-3 (closed as R1 is energized), R16-5, R17-5, R18-5 to TR2 and the "A" channel keying relay. The master clock contacts maintain the clock signal until 58′-02″. During the past minute's cycle, the energization of R14 opens R14-1 to R14-10 so that the group selection switches are disconnected in the event no automatic operation is scheduled. At 58′00″, the master clock contacts 53 again close to initiate a second cycle of the panel as in the previous minute, the "start" impulse of this cycle coinciding with the time signal for 2 seconds. Again a program can be scheduled in this minute subject only to the limitation that it must be an "on" function in the "A" channel.

Although programming in the minutes beginning at 57′00″ is limited to "A" channel "on" functions, it is possible that the program units could be slow so that other programs might conceivably be initiated during these minutes. In this event some one of the points R2-3 (if an "off" function), R16-5 (if a "B" channel operation), R17-5 (if a "C" channel operation), or R18-5 (if a "D" channel operation) would be open at 57′55″ when the master clock contacts 54 close, so that the time signal would not be transmitted. However, at 59′10″–59′45″ the rapid minute impulse would resynchronize the program units, and at 57′55″ of the next following hour the time signal would be transmitted in its usual fashion, and the system would become resynchronized.

If a manually-initiated cycle of the panel is in progress at 57′00″ when the master clock contacts 53 close either R1 or R2 will be energized and R1-8 or R2-8 open to prevent the energization of R24. Consequently, R14 will not be energized and the group selection switches (Fig. 3B) will remain active to control the cycle in progress. If the cycle is completed at 57′55″ when the master clock contacts 54 then the clock correction pulse will be delivered from M3, C7 (now closed), R2-3 (N.C.), R16-5, R17-5, R18-5 (all normally closed) and to the "A" channel keying relay R36 (Fig. 2C). If the manually initiated cycle is not complete at 57′55″, then one of several conditions could prevail.

A manual operation in the absence of an automatic program or clock interlock can be started at any time. If a cycle were manually started at 56′56″ then the panel would be in operation at 57′55″ when the clock signal was due to be delivered. However, as C15 opens at 59″ (at 57′55″ sidereal time in this case) to drop out all relays, then the full clock signal can be delivered as C7 is closed in this instance starting at 57′50″ until 2 seconds after the panel is restarted.

If the panel were manually started at any time from 56′57″ to 56′59″ on either an "off" function or an "on" function on any of the "B," "C," or "D" channels then one of the serial points R2-3, R16-5, R17-5 or R18-5 (Fig. 2C), would be open at 57′55″ to prevent transmission of the time signal until reclosure at from 57′56″ to 57′58″ respectively, either of which is too late to permit the passage of the full-time signal which would therefore be ineffective.

If the panel were manually started on an "A" channel "on" function at 56′56″ then one of the relays R2, R16, R17, R18 would be in operation during the cycle and C6 closes at 57′51″ (55″ cycle time) to produce the four second "on" pulse. When the master clock contacts close at 57′55″, the time signal will be passed as C7 in this instance closes at 57′50″ and remains closed until 2 seconds after the beginning of a new cycle. However, the 4 second "on" signal at 57′51″–57′55″ will merge with the clock signal to produce a 4 second early response in the secondary clocks.

If the panel is manually started in an "on" function "A" channel operation at 56′57″, then the "on" pulse will be produced from 57′52″ to 57′56″ and will add 3 seconds to the clock pulse to produce a clock error of 3 seconds fast. An operation at 56′58″ will produce a 2 second error, and one at 56′59″, a 1 second error. Inasmuch as these are special cases requiring the exact intervention of an operator within a few seconds of time, the sacrifice of an additional minute's time when no manual signals can be sent to prevent this type of operation is not deemed economic, particularly wherein this slight error is with the frequency variations of the 60 cycle power supply and will be corrected out by the correction signal of the next hour.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In combination with an electric clock system including a master clock having a plurality of contacts therein each adapted to be closed at predetermined sidereal times, a program device periodically advanced by the closure of a first of said plurality of contacts in said master clock and having a plurality of circuit closing members adapted to be selectively closed at predetermined sidereal times, an impulse control device adapted when operative to control the production of a plurality of impulses, means jointly responsive to the closure of a second of said plurality of contacts in said master clock and the closure of any of predetermined ones of said circuit closing members for rendering said impulse control device operative to produce selected ones of said impulses, a signal generator capable of producing signals at any of a plurality of carrier frequencies and having a plurality of selectively operable control devices each effective when operated to cause a signal of a selected carrier frequency to be produced by said generator, and selection means directly controlled by said second of said plurality of master clock contacts and operable jointly in response to the selective closure of said circuit closing members and to the impulses produced by said impulse control device for operating the control devices of said signal generator selectively to produce a signal of any selected frequency in response to any selected impulse.

2. In a control apparatus for controlling the setting of clocks and the energization status of a plurality of remote switching apparatuses, the said clocks and the said switching apparatuses being connected to a common signal line and operative responsive to signals having predetermined time and frequency characteristics, a master clock having a plurality of contacts therein each adapted to be closed at predetermined sidereal times, a signal generator connected to said line and adapted to be selectively controlled to produce current on said line of any one of a plurality of predetermined frequencies, impulsing means for producing impulses having a predetermined relative timed relationship for the selective control of said switching apparatuses, frequency selection means, means jointly responsive to said frequency selection means and said impulsing means for controlling said signal generator to produce impulses of a selected one of said plurality of frequencies, means responsive to the closure of one of said contacts for operating said signal generator to produce a clock regulating impulse on said line of a predetermined one of said plurality of frequencies, and means for preventing the operation of said signal generator by said contacts when said impulsing means is operating said signal generator on other than said predetermined one of said frequencies.

3. In a control apparatus for controlling the setting of clocks and the energization status of a plurality of remote switching apparatuses, the said clocks and the said switching apparatuses being connected to a common signal line and operative responsive to signals having predetermined time and frequency characteristics, a master clock having a plurality of contacts therein each adapted to be closed at predetermined sidereal times, a signal generator connected to said line and adapted to be selectively controlled to produce current on said line of any one of a plurality of predetermined frequencies, impulsing means for producing impulses having a predetermined relative timed relationship for the selective control of said switching apparatuses, frequency selection means, means jointly responsive to said frequency selection means and said impulsing means for controlling said signal generator to produce impulses of a selected one of said plurality of frequencies, means responsive to the closure of one of said contacts for operating said signal generator to produce a clock regulating impulse on said line of a predetermined one of said plurality of frequencies, and means for preventing the operation of said signal generator by said one contact if said signal generator already is being operated by said impulsing means at the time when said one contact is closed.

References Cited in the file of this patent

UNITED STATES PATENTS

| | | |
|---|---|---|
| 1,689,294 | Potts | Oct. 30, 1928 |
| 2,355,903 | Blount | Aug. 15, 1944 |
| 2,395,132 | Mackenzie | Feb. 19, 1946 |
| 2,627,063 | Richards | Jan. 27, 1953 |
| 2,720,641 | Schumacher | Oct. 11, 1955 |